US011222109B2

(12) United States Patent
Okumura

(10) Patent No.: US 11,222,109 B2
(45) Date of Patent: Jan. 11, 2022

(54) COMPUTER-READABLE MEDIUM AND INFORMATION PROCESSING DEVICE FOR REDUCING TROUBLESOME OPERATIONS FOR AUTHENTICATED ACCESS TO CLOUD SERVER

(71) Applicant: BROTHER KOGYO KABUSHIKI KAISHA, Aichi (JP)

(72) Inventor: Fumio Okumura, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 305 days.

(21) Appl. No.: 16/351,618

(22) Filed: Mar. 13, 2019

(65) Prior Publication Data

US 2019/0286811 A1 Sep. 19, 2019

(30) Foreign Application Priority Data

Mar. 13, 2018 (JP) .............................. JP2018-045456

(51) Int. Cl.
| G06F 15/16 | (2006.01) |
| G06F 21/45 | (2013.01) |
| H04L 29/06 | (2006.01) |
| H04L 29/08 | (2006.01) |
| H04L 12/24 | (2006.01) |

(52) U.S. Cl.
CPC .............. *G06F 21/45* (2013.01); *H04L 41/22* (2013.01); *H04L 63/08* (2013.01); *H04L 67/10* (2013.01)

(58) Field of Classification Search
CPC ..... G06F 21/45; G06F 21/6218; H04L 41/22; H04L 63/08; H04L 67/10
See application file for complete search history.

(56) References Cited

U.S. PATENT DOCUMENTS

| 9,069,516 | B2 * | 6/2015 | Sugimura | .......... H04N 1/32101 |
| 9,319,549 | B2 * | 4/2016 | Kimura | ................. G06F 3/1275 |
| 2014/0129607 | A1 * | 5/2014 | Nagumo | ............. H04L 41/5048 709/201 |

(Continued)

FOREIGN PATENT DOCUMENTS

JP 2014-045461 A 3/2014

*Primary Examiner* — Cheikh T Ndiaye
(74) *Attorney, Agent, or Firm* — Scully Scott Murphy and Presser

(57) ABSTRACT

A non-transitory computer-readable medium stores computer-executable instructions causing an information processing device to accept settings for a sequence of operations executable using a cloud server, accept a selection of the cloud server, acquire authentication information for accessing the cloud server, store the authentication information in association with cloud information specifying the cloud server, store a sequence record including the cloud information and setting information representing the settings for the sequence, when accepting a selection of the sequence record, execute the sequence in accordance with the setting information and access the cloud server with the authentication information, when accepting a selection of another sequence record including the same cloud information as included in the sequence record, execute another sequence in accordance with setting information of the another sequence record and access the cloud server with the authentication information associated with the same cloud information as included in the sequence record.

9 Claims, 9 Drawing Sheets

(56) References Cited

U.S. PATENT DOCUMENTS

2015/0040189 A1* 2/2015 Fujii ................. H04L 63/08
                                                    726/3
2017/0329903 A1* 11/2017 Shu ............... G06F 16/24553
2018/0107956 A1* 4/2018 Yamada ............ H04L 63/10

* cited by examiner

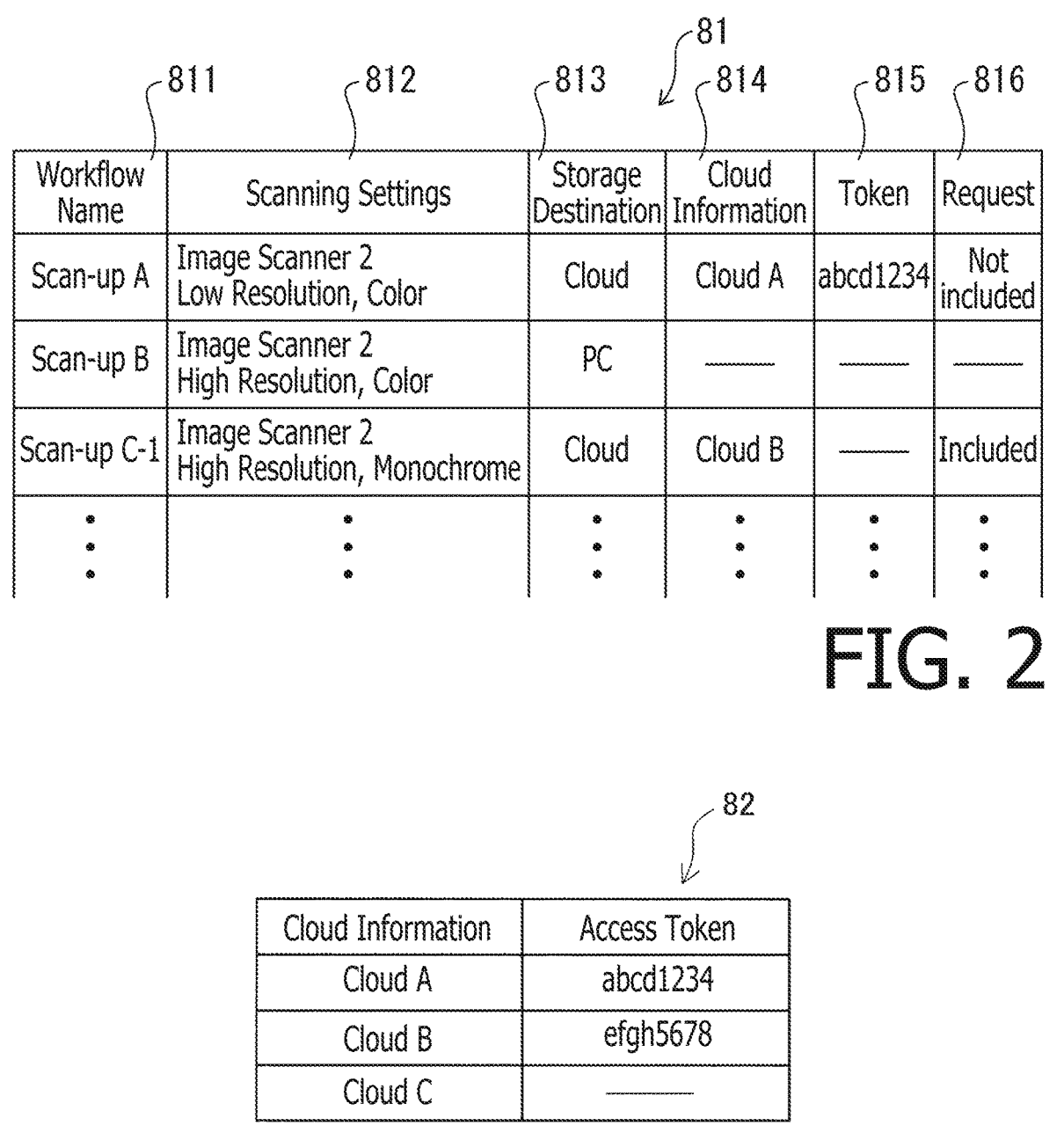

| Workflow Name | Scanning Settings | Storage Destination | Cloud Information | Token | Request |
|---|---|---|---|---|---|
| Scan-up A | Image Scanner 2<br>Low Resolution, Color | Cloud | Cloud A | abcd1234 | Not included |
| Scan-up B | Image Scanner 2<br>High Resolution, Color | PC | — | — | — |
| Scan-up C-1 | Image Scanner 2<br>High Resolution, Monochrome | Cloud | Cloud B | — | Included |
| ⋮ | ⋮ | ⋮ | ⋮ | ⋮ | ⋮ |

FIG. 2

| Cloud Information | Access Token |
|---|---|
| Cloud A | abcd1234 |
| Cloud B | efgh5678 |
| Cloud C | — |

FIG. 3

COMPUTER-READABLE MEDIUM AND INFORMATION PROCESSING DEVICE FOR REDUCING TROUBLESOME OPERATIONS FOR AUTHENTICATED ACCESS TO CLOUD SERVER

CROSS-REFERENCE TO RELATED APPLICATION

This application claims priority under 35 U.S.C. § 119 from Japanese Patent Application No. 2018-045456 filed on Mar. 13, 2018. The entire subject matter of the application is incorporated herein by reference.

BACKGROUND

Technical Field

Aspects of the present disclosure are related to a non-transitory computer-readable medium and an information processing device for reducing troublesome operations required for authenticated access to a cloud server.

Related Art

In recent years, technologies using a cloud server on the Internet have been known in which data is uploaded or downloaded between an information processing device (e.g., a PC and a smartphone) and a storage server provided by the cloud service. For instance, a technology to upload scanned image data generated by an image scanner to the cloud server has been disclosed.

SUMMARY

A user needs to be authenticated to access the cloud server. Therefore, the user may be required to perform troublesome operations for the authentication. The disclosed technology provides no suggestion for reducing the troublesome operations. Thus, there is room for improvement in a procedure of the authentication.

Aspects of the present disclosure are advantageous to provide one or more improved techniques that make it possible to reduce troublesome operations required for authenticated access to a cloud server with an application executed by an information processing device.

According to aspects of the present disclosure, a non-transitory computer-readable medium storing computer-executable instructions is provided. The instructions are configured to, when executed by a processor of an information processing device, cause the processor to accept settings for a sequence of operations via a user interface of the information processing device, the sequence of operations being executable via authenticated access to a cloud server, accept, via the user interface, a selection of the cloud server from among a plurality of cloud servers, acquire, from the selected cloud server, authentication information required to access the selected cloud server, store the acquired authentication information in association with cloud information specifying the selected cloud server, store a first sequence record into a memory of the information processing device, the first sequence record including setting information and the cloud information associated with each other, the setting information representing the settings for the sequence of operations, and in response to accepting a sequence executing instruction, perform a sequence executing process. The sequence executing process includes, in response to accepting, via the user interface, a selection of the first sequence record from among a plurality of sequence records stored in the memory, reading out the selected first sequence record from the memory, and executing the sequence of operations in accordance with the setting information included in the read first sequence record, during the sequence of operations, accessing the cloud server specified by the cloud information included in the first sequence record, with the authentication information corresponding to the specified cloud server, in response to accepting, via the user interface, a selection of a second sequence record from among the plurality of sequence records stored in the memory, reading out the selected second sequence record from the memory, the second sequence record including the same cloud information as included in the first sequence record, executing another sequence of operations in accordance with setting information included in the read second sequence record, and during the another sequence of operations, accessing the cloud server specified by the same cloud information as included in the first sequence record, with the authentication information stored in association with the same cloud information as included in the first sequence record.

According to aspects of the present disclosure, a non-transitory computer-readable medium storing computer-executable instructions is provided. The instructions are configured to, when executed by a processor of an information processing device, cause the processor to accept settings for a sequence of operations via a user interface of the information processing device, the sequence of operations being executable via authenticated access to a cloud server, accept, via the user interface, a selection of the cloud server from among a plurality of cloud servers, acquire, from the selected cloud server, authentication information required to access the selected cloud server, store the acquired authentication information in association with cloud information specifying the selected cloud server, store a sequence record into a memory of the information processing device, the sequence record including setting information and the cloud information associated with each other, the setting information representing the settings for the sequence of operations, and in response to accepting a sequence executing instruction, perform a sequence executing process. The sequence executing process includes, in response to accepting, via the user interface, a selection of the sequence record from among a plurality of sequence records stored in the memory, reading out the selected sequence record from the memory, and executing the sequence of operations in accordance with the setting information included in the selected sequence record, and during the sequence of operations, performing, when the selected sequence record does not include the authentication information, reading out the authentication information stored in association with the same cloud information as included in the selected sequence record, and accessing the cloud server specified by the cloud information included in the selected sequence record, with the read authentication information.

According to aspects of the present disclosure, further provided is an information processing device including a user interface, a memory, and a controller. The controller is configured to accept settings for a sequence of operations via the user interface, the sequence of operations being executable via authenticated access to a cloud server, accept, via the user interface, a selection of the cloud server from among a plurality of cloud servers, acquire, from the selected cloud server, authentication information required to access the selected cloud server, store the acquired authentication information in association with cloud information specifying the selected cloud server, store a first sequence record into the memory, the first sequence record including setting information and the cloud information associated with each other, the setting information representing the settings for the sequence of operations, and in response to accepting a sequence executing instruction, perform a sequence executing process. The sequence executing process includes, in response to accepting, via the user interface, a selection of the first sequence record from among a plurality of sequence records stored in the memory, reading out the selected first sequence record from the memory, executing the sequence of operations in accordance with the setting information included in the read first sequence record, during the sequence of operations, accessing the cloud server specified by the cloud information included in the first sequence record, with the authentication information corresponding to the specified cloud server, in response to accepting, via the user interface, a selection of a second sequence record from among the plurality of sequence records stored in the memory, reading out the selected second sequence record from the memory, the second sequence record including the same cloud information as included in the first sequence record, executing another sequence of operations in accordance with setting information included in the read second sequence record, and during the another sequence of operations, accessing the cloud server specified by the same cloud information as included in the first sequence record, with the authentication information stored in association with the same cloud information as included in the first sequence record.

According to aspects of the present disclosure, further provided is an information processing device including a user interface, a memory, and a controller. The controller is configured to accept settings for a sequence of operations via the user interface, the sequence of operations being executable via authenticated access to a cloud server, accept, via the user interface, a selection of the cloud server from among a plurality of cloud servers, acquire, from the selected cloud server, authentication information required to access the selected cloud server, store the acquired authentication information in association with cloud information specifying the selected cloud server, store a sequence record into the memory, the sequence record including setting information and the cloud information associated with each other, the setting information representing the settings for the sequence of operations, and in response to accepting a sequence executing instruction, perform a sequence executing process. The sequence executing process includes, in response to accepting, via the user interface, a selection of the sequence record from among a plurality of sequence records stored in the memory, reading out the selected sequence record from the memory, executing the sequence of operations in accordance with the setting information included in the selected sequence record, and during the sequence of operations, performing, when the selected sequence record does not include the authentication information, reading out the authentication information stored in association with the same cloud information as included in the selected sequence record, and accessing the cloud server specified by the cloud information included in the selected sequence record, with the read authentication information.

BRIEF DESCRIPTION OF THE ACCOMPANYING DRAWINGS

FIG. 1 is a block diagram schematically showing an electrical configuration of a PC in an illustrative embodiment according to one or more aspects of the present disclosure.

FIG. 2 exemplifies a workflow table in the illustrative embodiment according to one or more aspects of the present disclosure.

FIG. 3 exemplifies an authentication information table in the illustrative embodiment according to one or more aspects of the present disclosure.

FIGS. 4A and 4B are flowcharts showing a procedure of a workflow creating process in the illustrative embodiment according to one or more aspects of the present disclosure.

FIG. 5 exemplifies a workflow creating screen in the illustrative embodiment according to one or more aspects of the present disclosure.

Figure 8:
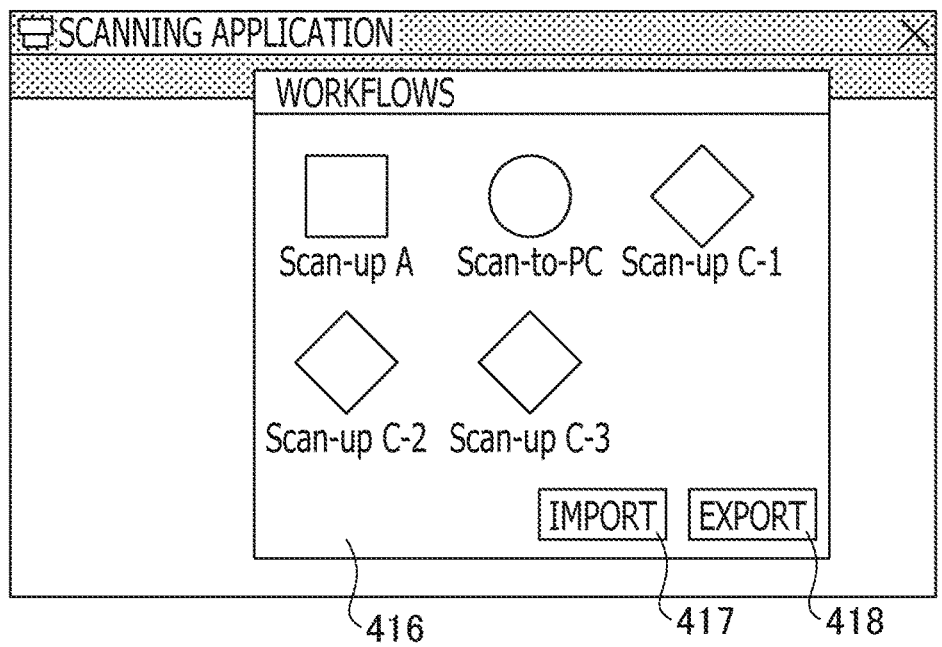

FIG. 8 exemplifies a list screen for listing selectable workflows, in the illustrative embodiment according to one or more aspects of the present disclosure.

Figure 9:
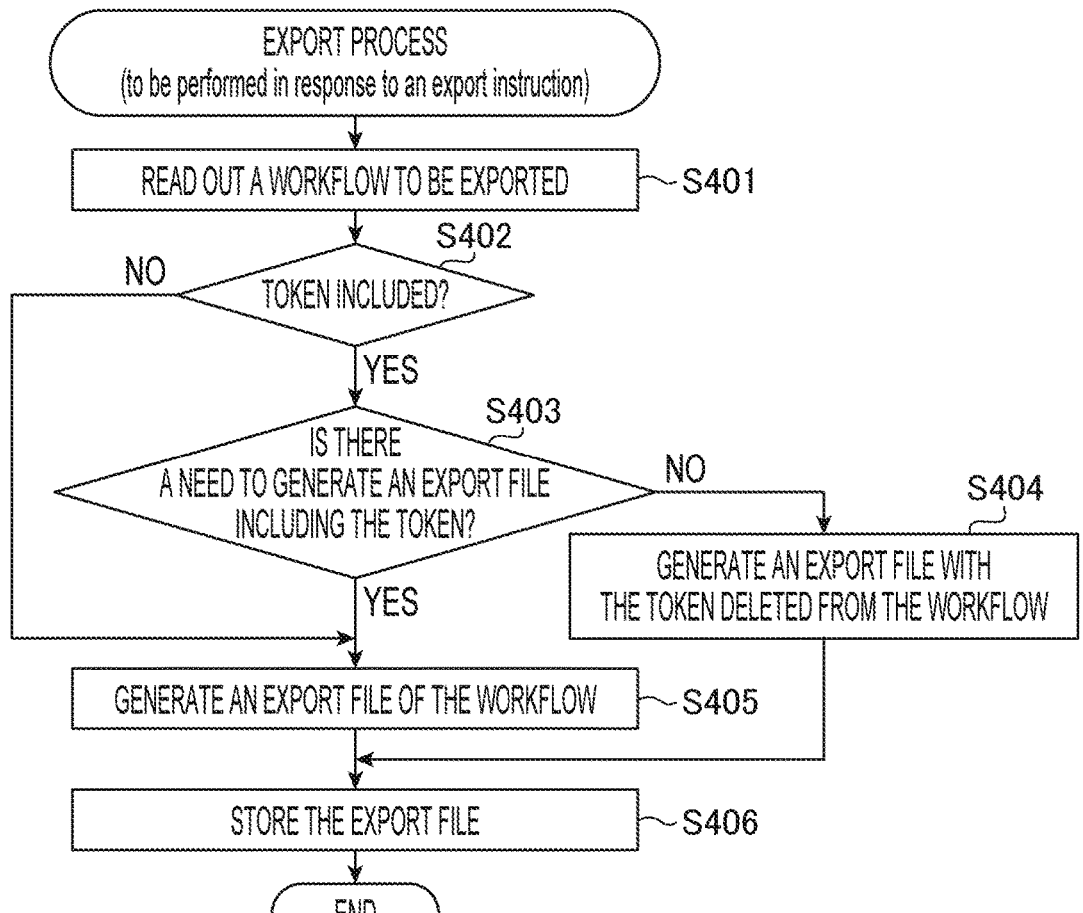

FIG. 9 is a flowchart showing a procedure of an export process in the illustrative embodiment according to one or more aspects of the present disclosure.

Figure 10:
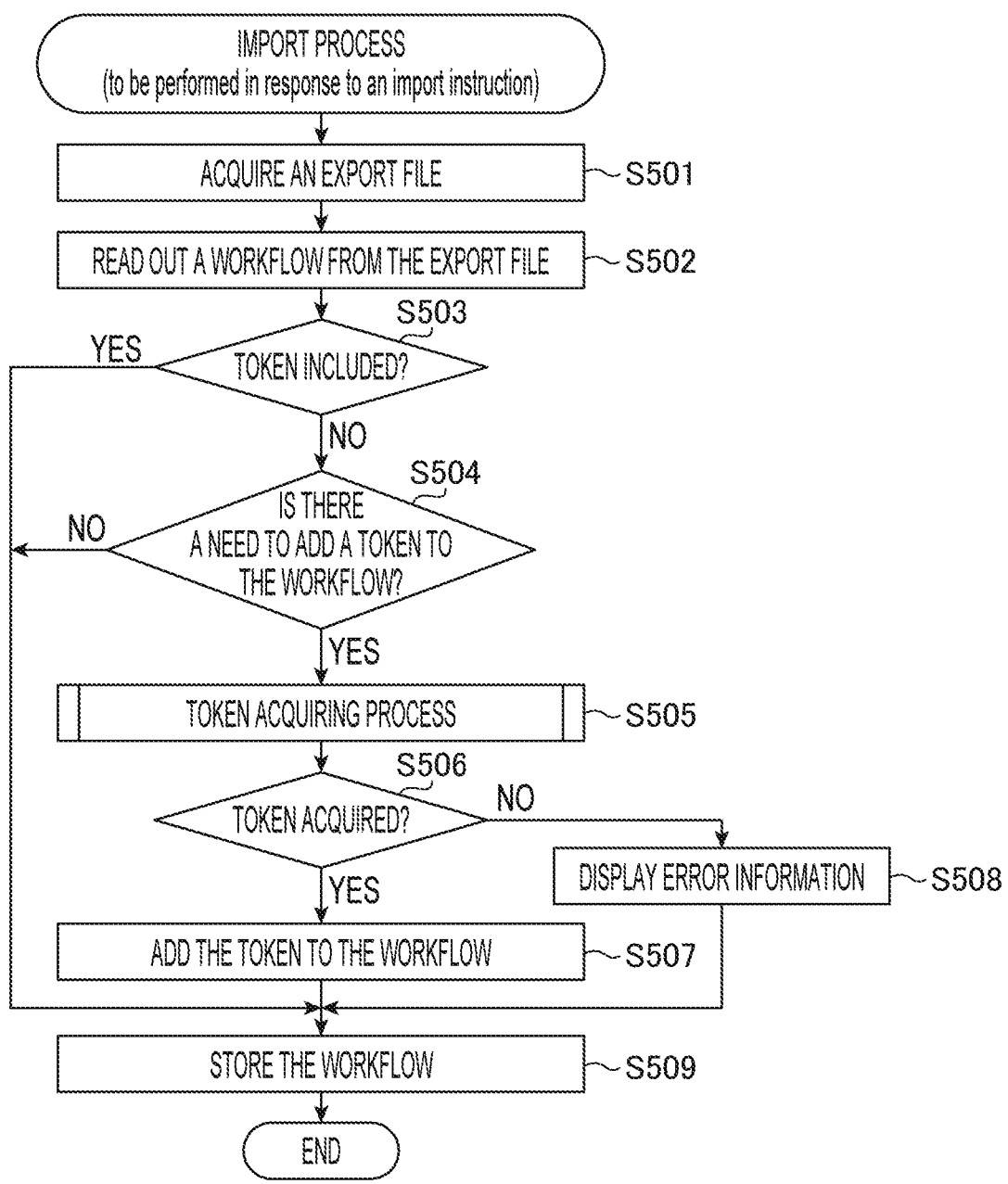

FIG. 10 is a flowchart showing a procedure of an import process in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. In the illustrative embodiment, aspects of the present disclosure are applied to a scanning application program executable by a PC.

Figure 1:
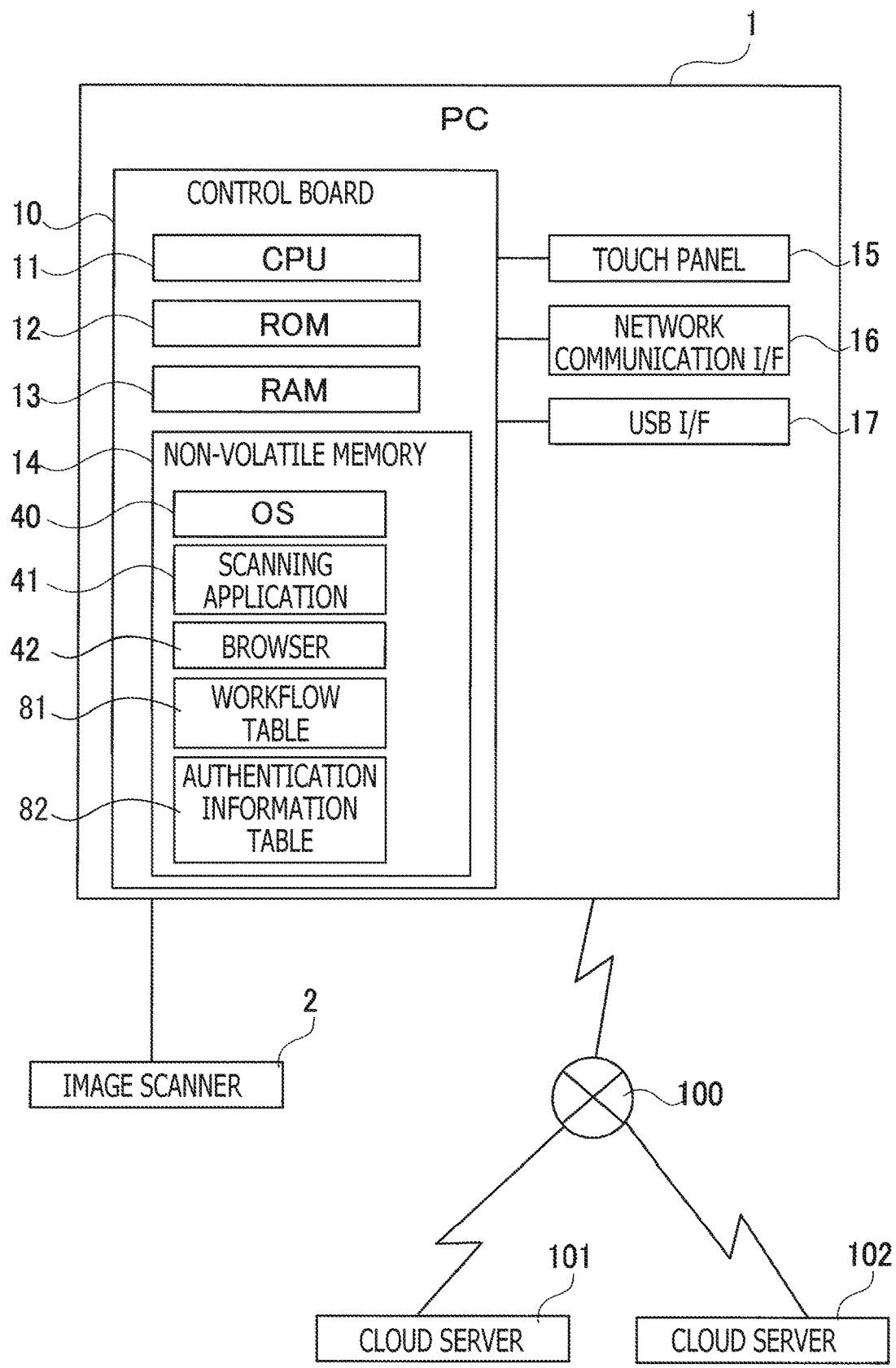

As shown in FIG. 1, in the illustrative embodiment, a PC 1 is connected with an image scanner 2 and may receive image data from the image scanner 2. The PC 1 is configured to execute various programs. For instance, the PC 1 may be replaced with another information processing device such as a tablet computer and a smartphone.

The image scanner 2 is configured to scan a document sheet to generate image data representing a scanned image of the document sheet and send the image data to the PC 1. Although a single image scanner 2 is connected with the PC 1 in the example shown in FIG. 1, a plurality of image scanners 2 may be connected with the PC 1. Further, what is to be connected with the PC 1 is not limited to the image scanner 2 but may be devices or apparatuses (e.g., copy machines, facsimile machines, and digital cameras) configured to acquire image data and send the acquired image data to the PC 1.

As shown in FIG. 1, in the illustrative embodiment, the PC 1 is connected with an Internet 100 and connected with a cloud server 101 and a cloud server 102 via the Internet 100. Namely, a user of the PC 1 is allowed to use various cloud services provided via the Internet 100.

In each cloud service, one or more storage servers and one or more authentication servers may be managed. Further, each cloud service may offer a service to upload data to a managed storage server and download data from the storage server. At least one storage server may serve as an authentication server. In the following description, one or more storage servers and one or more authentication servers managed in a single cloud service may not separately but collectively be referred to as "cloud servers." In the example shown in FIG. 1, the PC 1 is connected with the two cloud servers 101 and 102. Nonetheless, the number of cloud servers actually connectable with the PC 1 is not limited to two. Namely, the number of cloud servers accessible from the PC 1 may be more than two.

As shown in FIG. 1, in the illustrative embodiment, the PC 1 includes a control board 10, which includes a CPU 11, a ROM 12, a RAM 13, and a non-volatile memory 14. Further, the PC 1 includes a touch panel 15, a network communication I/F ("I/F" is an abbreviation of "interface") 16, and a USB I/F 17 that are electrically connected with the control board 10.

The ROM 12 stores therein programs such as a boot program for booting the PC 1. The RAM 13 is usable as a work area when various kinds of processing are performed or as a storage area to temporarily store data. The non-volatile memory 14 may include at least one of storage devices such as an HDD and a flash memory. The non-volatile memory 14 is usable as a storage area to store various programs, various types of data such as image data, and various settings.

The CPU 11 is configured to perform various kinds of processing in accordance with programs read out of the ROM 12 or the non-volatile memory 14, or based on user instructions. It is noted that the "control board 10" may be a general term for collectively referring to hardware elements and software elements used to control the PC 1. Namely, the control board 10 may not necessarily represent a single hardware element actually existing in the PC 1.

The touch panel 15 is configured to accept therethrough user operations and display thereon information. Namely, the touch panel 15 is a user I/F that doubles as an input device and an output device. The user I/F may not necessarily be limited to the touch panel 15 but may include a combination of a display, a keyboard, and a mouse.

The network communication I/F 16 includes a hardware element configured to communicate with an external device via the Internet 100. A communication system for the network communication I/F 16 may be a wireless system or a wired system, and may comply with any type of communication standards such as standards for LAN and Wi-Fi (registered trademark). Further, the USB I/F 17 includes a hardware element configured to communicate with the image scanner 2. It is noted that there may be an image scanner connected with the PC 1 via the network communication I/F 16.

The non-volatile memory 14 stores therein various programs including but not limited to an OS ("OS" is an abbreviation of "operating system") 40, a scanning application program (hereinafter, which may be simply referred to as a "scanning application") 41, and a browser 42. The scanning application 41 is a program to, based on user instructions, communicate with the image scanner 2, transmit settings for image scanning and a scanning instruction to the image scanner 2, receive from the image scanner 2 image data representing an image scanned by the image scanner 2, display the image represented by the received image data, and save the image data. The browser 42 is a program to display web pages. It is noted that a part of the OS 40 may be stored in the ROM 12. The non-volatile memory 14 further stores therein various kinds of information such as a below-mentioned workflow table 81 and a below-mentioned authentication information table 82.

A storage medium in which the scanning application 41 is stored may not necessarily be limited to the non-volatile memory 14. The scanning application 41 may be stored in any of other non-transitory computer-readable storage media including but not limited to a CD-ROM and a DVD-ROM. The non-transitory computer-readable storage media are tangible media. Meanwhile, electric signals carrying programs downloaded from a server on the Internet may be classified as computer-readable signal media but are not included in the non-transitory computer-readable storage media.

Subsequently, the scanning application 41 will be described. In the following description, processes, operations, and steps of flowcharts may basically represent processing by the CPU 11 in accordance with instructions written in programs such as the scanning application 41. Namely, in the following description, operations such as "determining," "receiving," "acquiring," "accepting," and "controlling" may represent processing by the CPU 11. Processing by the CPU 11 may include hardware control using an interface such as an API ("API" is an abbreviation of "Application Programming Interface") for exchanging data with other modules of the OS 40 of the PC 1. It is noted that, in the present disclosure, processes, operations, and steps of each program may be described without referring to the OS 40. Specifically, for instance, in the following description, a description "a program P controls a hardware element H" may represent that the program P controls the hardware element H with the API of the OS 40. Further, "acquiring" may include a concept of acquiring something with no need to make a request for the something. Specifically, for instance, an operation of the CPU 11 receiving data without making a request for the data may be included in a concept "the CPU 11 acquires the data." Further, "data" referred to in the present disclosure may be expressed as a computer-readable bit string. Further, two pieces of data that have substantially the same contents and have mutually different formats may be treated as the same data. The same applies to "information" referred to in the present disclosure. Further, "requesting" may include a concept of transmitting information indicating what is requested to the other party. Likewise, "instructing" may include a concept of transmitting information indicating what is instructed to do to the other party. Furthermore, information indicating what is requested and information indicating what is instructed to do may be simply referred to as a "request" and an "instruction," respectively.

Further, processing by the CPU 11 in accordance with instructions written in a program may be expressed using simplified or partially-omitted wording. Specifically, for instance, "the CPU 11 executing the scanning application 41 performs something" may be expressed as "the scanning application 41 performs something." Further, a process of the CPU 11 determining whether information A represents occurrence of an event B may be conceptually expressed as "the CPU 11 determines whether an event B is occurring, from information A." Further, a process of the CPU 11 determining whether information A represents occurrence of an event B or represents occurrence of an event C may be conceptually expressed as "the CPU 11 determines whether an event B is occurring or an event C is occurring, from information A."

In the illustrative embodiment, the scanning application 41 is configured to, when booted, display on the touch panel 15 a screen for accepting user operations. For instance, the scanning application 41 displays on the touch panel 15 a setting screen for accepting settings for a workflow. The workflow is for storing a sequence of operations. For instance, the scanning application 41 accepts user operations to set, as the workflow, a sequence of operations for causing the image scanner 2 to scan an image based on particular scanning settings and storing image data representing the scanned image into a particular location. The scanning application 41 stores a workflow record representing the set workflow into the non-volatile memory 14. FIG. 2 exemplifies a workflow table 81 including a plurality of workflow records. Hereinafter, a "workflow record" may be referred to as a "workflow" or a "sequence record." Namely, hereinafter, "execute a workflow" may denote "execute a workflow represented by a workflow record."

Then, the scanning application 41 accepts a user operation to select one of the workflows stored in the non-volatile memory 14 and a user operation to execute the selected workflow. In response to accepting the instruction to execute the selected workflow, the scanning application 41 executes a sequence of operations based on information included in the workflow read out of the non-volatile memory 14. By previously register frequently-used settings for image scanning as a workflow, the user may quickly invoke and perform a series of operations for the settings.

The scanning application 41 accepts settings of a plurality of workflows, and for instance, accepts operations to provide each of the workflows with a name and store the settings of the workflows in association with the respective names into the non-volatile memory 14. The workflow table 81 (see FIG. 2) includes, in each of the workflows registered thereon, a workflow name 811, scanning settings 812, a storage destination 813, cloud information 814, a token 815, and a request 816.

The workflow name 811 is information for identifying each individual workflow. The scanning settings 812 include settings for image scanning such as an image scanner specified for the image scanning, a scanning resolution, and a scanning mode for specifying one of color scanning and monochrome scanning.

In the illustrative embodiment, the scanning application 41 accepts a selection of uploading image data to a cloud server as a storage destination of the image data. Specifically, the scanning application 41 accepts a user operation to set, as a workflow, a sequence of operations including scanning an image and uploading image data of the scanned image to a cloud server. In the workflow table 81 shown in FIG. 2, the storage destination 813 is information for specifying whether the image data is to be saved to a cloud server (Cloud) or to the PC 1 (PC) in each individual workflow. Hereinafter, the sequence of operations including scanning an image and uploading image data of the scanned image to a cloud server may be referred to as a "scan-up process."

In the workflow table 81 shown in FIG. 2, the cloud information 814 is used when "Cloud" is set for the storage destination 813. Namely, the cloud information 814 is identification information for identifying a cloud server to be used in each workflow with "Cloud" set for the storage destination 813. The scanning application 41 has a plurality of available cloud servers registered therein. The scanning application 41 accepts a selected one of the plurality of registered cloud servers. It is noted that a same cloud server may be set in common among a plurality of workflows.

Each of the plurality of cloud servers has an individual management system. Therefore, in an attempt to upload image data to a selected cloud server, the scanning application 41 (more specifically, the user of the scanning application 41) needs to be authenticated in accordance with regulations for the cloud server and acquire authentication information. For instance, an authentication method using OAuth 2.0 may be employed for the selected cloud server. In the authentication method using OAuth 2.0, the PC 1 receives, from the selected cloud server, an access token as the authentication information in response to transmitting account information of the user to the cloud server. When uploading the image data to the selected cloud server, the scanning application 41 transmits the image data with the access token. The access token may be an example of the authentication information. Hereinafter, the access token may be simply referred to as a "token."

In the illustrative embodiment, to create a workflow including the scan-up process, the scanning application 41 accepts a selection as to whether to create a workflow including the token of the selected cloud server or a workflow not including the token of the selected cloud server. Namely, the scanning application 41 may create a workflow including the token of the selected cloud server or a workflow not including the token of the selected cloud server, based on a user instruction. In the workflow table 81 shown in FIG. 2, the token 815 is information regarding the token when a selection of creating a workflow including the token is accepted. In each workflow not including the token, no information is registered as the token 815.

Further, in an attempt to create the workflow including the scan-up process, the scanning application 41 accepts a selection as to whether to create a workflow including authentication request information or a workflow not including the authentication request information. The authentication request information represents whether to acquire the authentication information from the selected cloud server while executing the workflow. Then, the scanning application 41 may create a workflow including the authentication request information or a workflow not including the authentication request information, based on a user instruction. In the workflow table 81 shown in FIG. 2, the request 816 is information representing whether the authentication request information is included in each individual workflow.

In response to accepting an instruction to execute a workflow including the scan-up process, the scanning application 41 determines whether the token is included in the workflow and whether the authentication request information is included in the workflow, with reference to the token 815 and the request 916 of the workflow table 81. When determining that the token is included in the workflow, i.e., when a token is registered as the token 815 in the corresponding workflow on the workflow table 81, the scanning application 41 uses the registered token. Further, when determining that the authentication request information is included in the workflow, i.e., when "Included" is registered as the request 816 in the corresponding workflow on the workflow table 81, the scanning application 41 transmits, to the corresponding cloud server, a request for the authentication information while executing the workflow.

It is noted that the authentication procedure for accessing the selected cloud server may be performed independently of the workflow. In the illustrative embodiment, when performing the authentication procedure for accessing the selected cloud server and acquiring a token from the cloud server, the scanning application 41 stores the acquired token into the non-volatile memory 14, in association with information specifying the cloud server.

The scanning application 41 has an authentication information table 82 stored in the non-volatile memory 14. As exemplified in FIG. 3, the authentication information table 82 stores a token of each cloud server. The example of FIG. 3 shows a state where the scanning application 41 has already acquired tokens from "Cloud A" and "Cloud B" of three available cloud servers, and the acquired tokens are registered on the authentication information table 82. Further, the example of FIG. 3 shows that the scanning application 41 has not yet acquired a token from "Cloud C." When determining that the workflow, instructed to be executed, includes "Not included" set for the request 816 and includes no information set for the token 815 on the workflow table 81, the scanning application 41 reads out a corresponding token from the authentication information table 82 and uses the token.

Figure 4A:
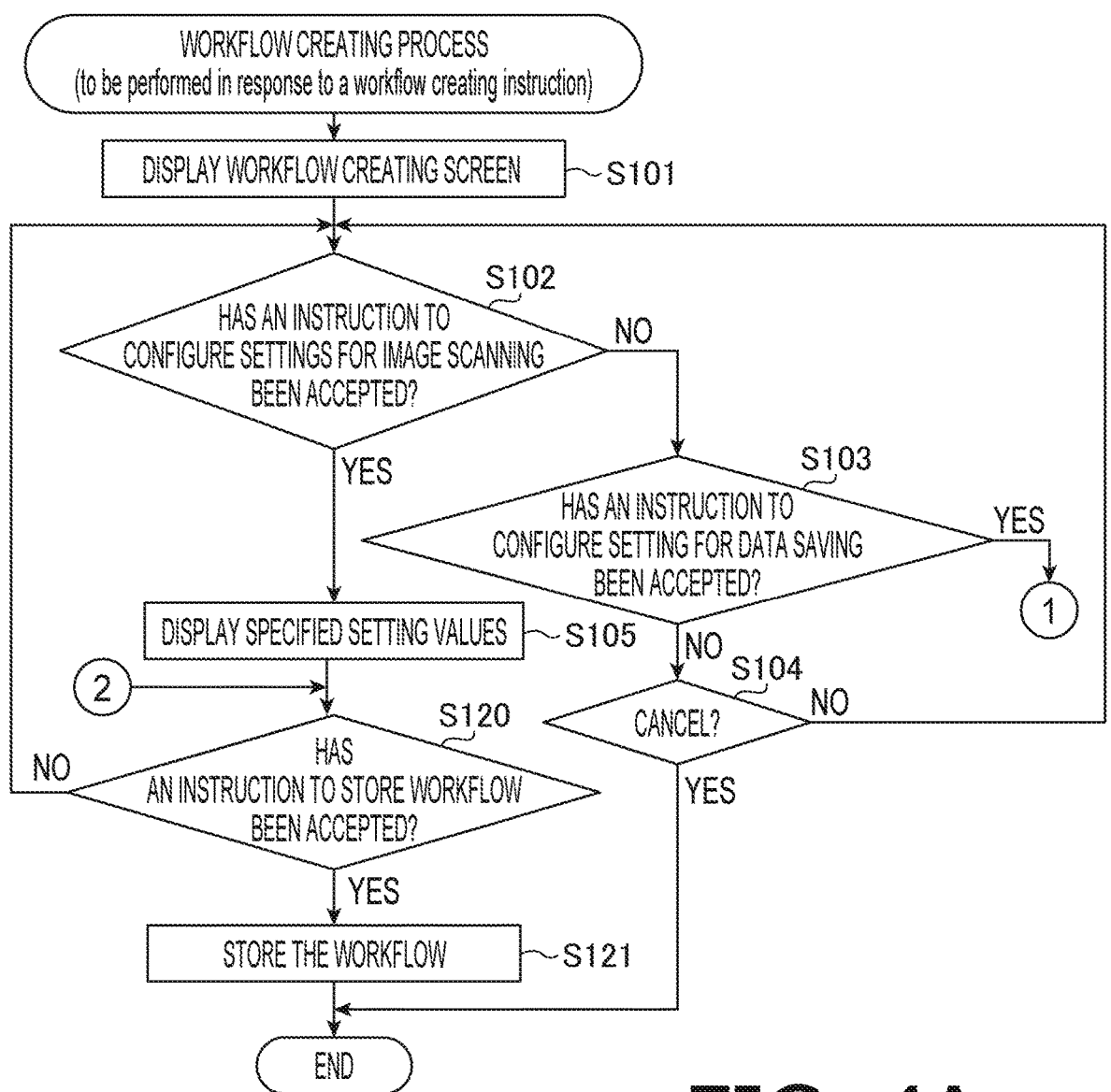
Figure 4B:
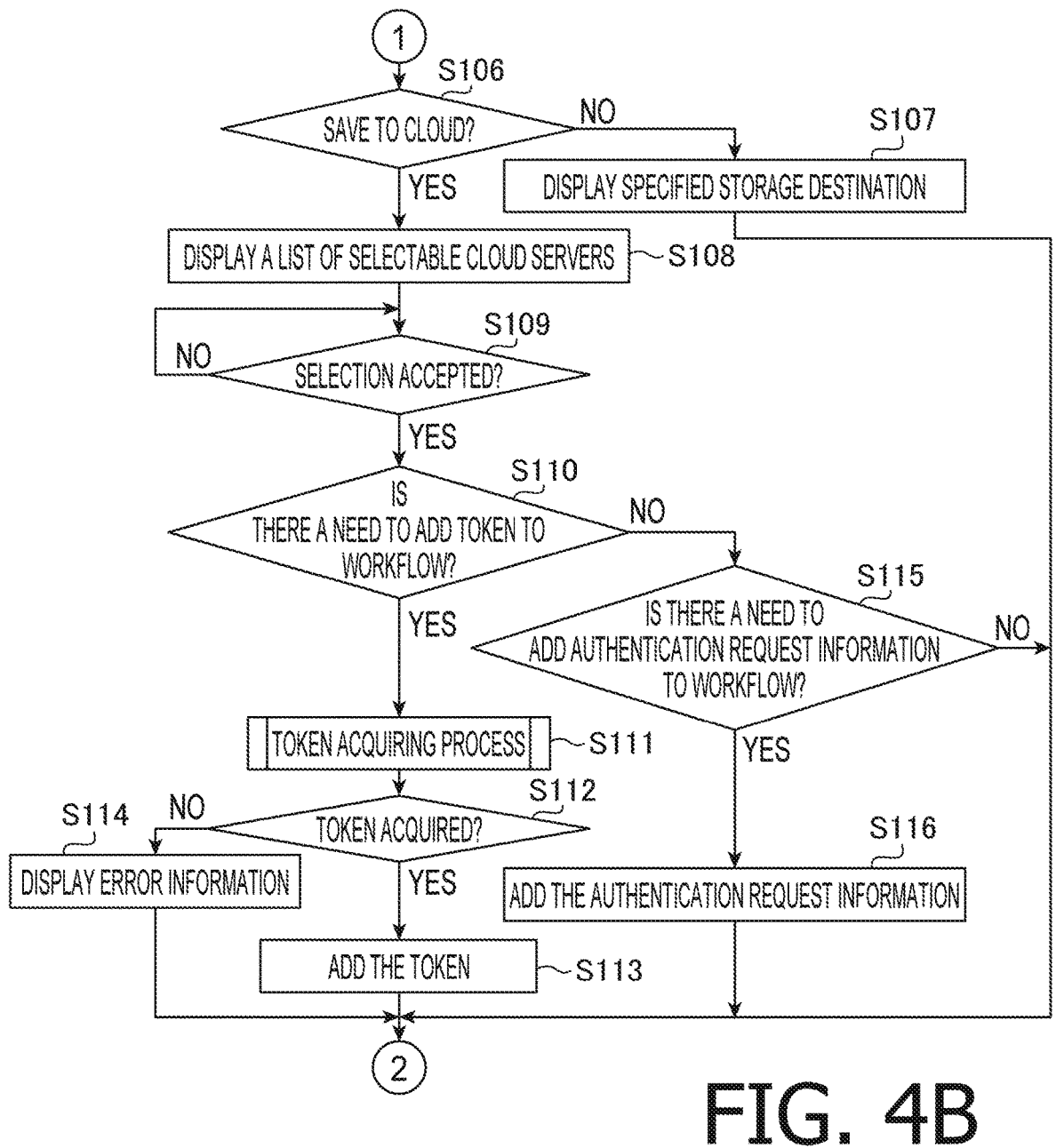

Subsequently, operations to create and execute a workflow with the scanning application 41 will be described with reference to the accompanying flowcharts. First, referring to FIGS. 4A and 4B, an explanation will be provided of a procedure of a workflow creating process by the CPU 11 to create a workflow with the scanning application 41. The CPU 11 performs the workflow creating process, in response to accepting a workflow creating instruction via the scanning application 41.

Figure 5:
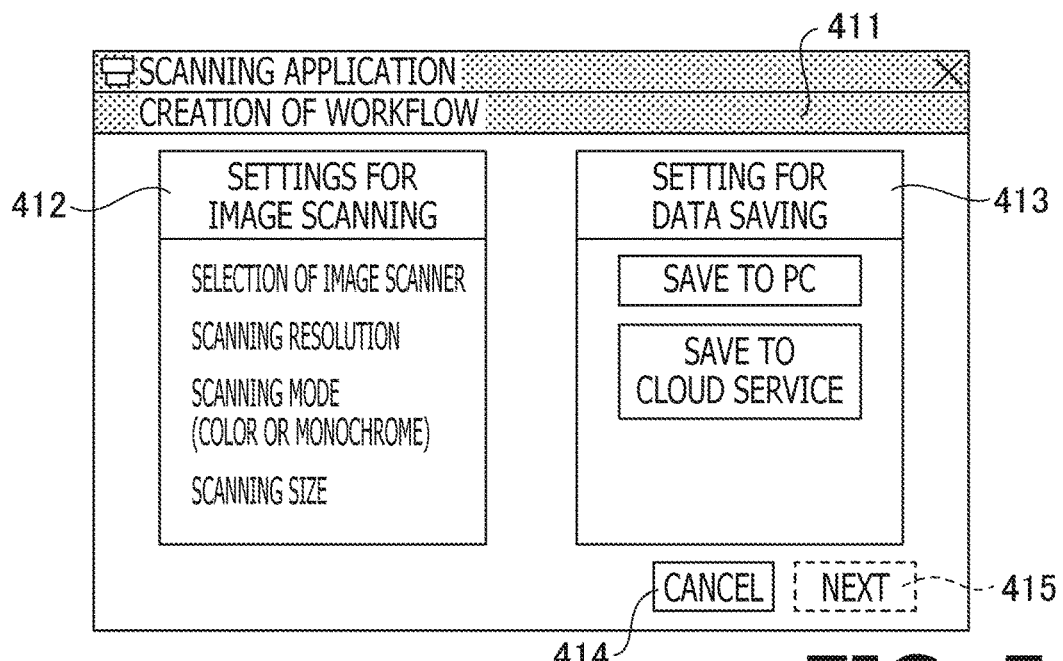

In the workflow creating process, the CPU 11 causes a display window for the scanning application 41 on the touch panel 15 to display a workflow creating screen 411 for creating a workflow (S101). FIG. 5 exemplifies the workflow creating screen 411. As shown in FIG. 5, the workflow creating screen 411 includes a scan setting window 412, a save setting window 413, and a cancel button 414. The scan setting window 412 is for accepting settings for image scanning. The save setting window 413 is for accepting a setting for data saving. For instance, the scanning application 41 accepts settings for image scanning such as a selected image scanner, a scanning resolution, a scanning mode selected between color scanning and monochrome scanning, and a scanning size. Further, the scanning application 41 accepts a setting for data saving to determine whether to save image data to the PC 1 (Save to PC) or to a cloud server (Save to Cloud Service). A button 415 indicated by a dashed line in FIG. 5 becomes selectable after acceptance of the settings for image scanning and data saving. The button 415 is configured to, when operated, accept an instruction to advance to a process to store the created workflow.

Referring back to FIG. 4A, the CPU 11 determines whether the CPU 11 has accepted an instruction to configure settings for image scanning (S102). For instance, when accepting an operation to the scan setting window 412, the CPU 11 may determine that the CPU 11 has accepted an instruction to configure settings for image scanning (S102: Yes). When determining that the CPU 11 has not accepted an instruction to configure settings for image scanning (S102: No), the CPU 11 determines whether the CPU 11 has accepted an instruction to configure a setting for data saving (S103). For instance, when accepting an operation to the save setting window 413, the CPU 11 may determine that the CPU 11 has accepted an instruction to configure a setting for data saving (S103: Yes).

When determining that the CPU 11 has not accepted an instruction to configure a setting for data saving (S103: No), the CPU 11 determines whether the CPU 11 has accepted a cancel instruction to cancel the workflow creating process (S104). For instance, when accepting an operation to the cancel button 414 (see FIG. 5), the CPU 11 may determine that the CPU 11 has accepted the cancel instruction (S104: Yes). When determining that the CPU 11 has not accepted the cancel instruction (S104: No), the CPU 11 goes back to S102 and waits until the CPU 11 accepts an instruction to configure settings for image scanning, an instruction to configure a setting for data saving, or the cancel instruction.

When determining that the CPU 11 has accepted an instruction to configure settings for image scanning (S102: Yes), the CPU 11 displays, on the scan setting window 412, setting values as specified by the accepted instruction (S105). It is noted that the CPU 11 may display, on the scan setting window 412, setting values used for the last image scanning as default values. Further, the CPU 11 may display, on the scan setting window 412, default values previously set for the selected image scanner.

Meanwhile, when determining that the CPU 11 has accepted an instruction to configure a setting for data saving (S103: Yes), the CPU 11 determines whether the CPU 11 has accepted an instruction to save image data to a cloud server (S106). When determining that the CPU 11 has not accepted an instruction to save image data to a cloud server (S106: No), the CPU 11 displays a specified storage destination on the save setting window 413 (S107).

When determining that the CPU 11 has accepted an instruction to save image data to a cloud server (S106: Yes), for instance, the CPU 11 displays, on the touch panel 15, a list of selectable cloud servers (S108). Then, the CPU 11 accepts a selection of a cloud server and determines whether a cloud server has been selected (S109). When determining that a cloud server has not been selected (S109: No), the CPU 11 waits until a cloud server is selected.

When determining that a cloud server has been selected (S109: Yes), the CPU 11 determines whether to add a token to the workflow being created (S110). As described above, the token is authentication information for uploading image data to the selected cloud server. Specifically, for instance, the CPU 11 causes the touch panel 15 to display a screen for inquiring of the user whether to add a token of the selected cloud server to the workflow being created, and accepts a user operation for responding to the inquiry.

Figure 6:
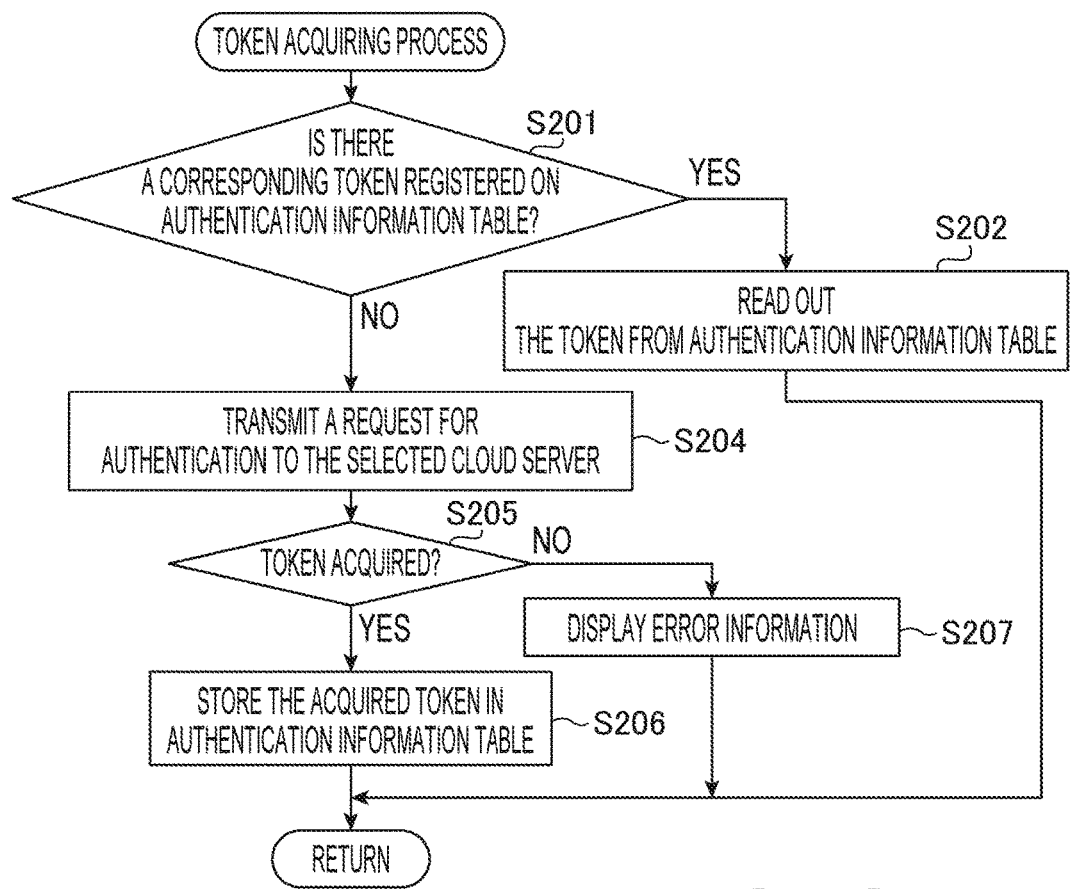
FIG. 6 is a flowchart showing a procedure of a token acquiring process in the illustrative embodiment according to one or more aspects of the present disclosure.

When determining to add a token to the workflow (S110: Yes), the CPU 11 performs a token acquiring process (S111). The token acquiring process is a process to acquire a token to be included in the workflow. The token acquiring process will be described with reference to FIG. 6.

In the token acquiring process, the CPU 11 determines whether a corresponding token is registered on the authentication information table 82 (S201). For instance, when the selected cloud server is "Cloud A" or "Cloud B," the CPU 11 determines that a corresponding token is registered on the authentication information table 82 shown in FIG. 3 (S201: Yes). Meanwhile, when the selected cloud server is "Cloud C," the CPU 11 determines that a corresponding token is not registered on the authentication information table 82 shown in FIG. 3 (S201: No).

When determining that a corresponding token is registered on the authentication information table 82 (S201: Yes), the CPU 11 reads out the token from the authentication information table 82 (S202). Meanwhile, when determining that a corresponding token is not registered on the authentication information table 82 (S201: No), the CPU 11 transmits a request for authentication to the selected cloud server to acquire the token (S204).

Specifically, for instance, the CPU 11 boots the browser 42 (see FIG. 1) and causes the browser 42 to display an authentication page of the selected cloud server. The CPU 11 accepts a user operation to input account information via the browser 42 and transmits the accepted account information to the selected cloud server, thereby acquiring the token from the selected cloud server. It is noted that the browser 42 may have a cache function to store information such as an ID and a password input in the past as cache information. In this case, the browser 42 may display the cache information in an entry field for the account information on the authentication page, thereby reducing troublesome operations to input the account information. Further, the browser 42 may transmit the cache information to the selected cloud server without displaying the authentication page.

Then, the CPU 11 determines whether the CPU 11 has acquired the token (S205). When determining that the CPU 11 has acquired the token (S205: Yes), the CPU 11 stores the acquired token into the authentication information table 82 in association with the cloud information (S206). Namely, when there is not a corresponding token registered on the authentication information table 82, the scanning application 41 stores the token acquired via the authentication procedure into the authentication information table 82 in association with the selected cloud server. Thereby, it is possible to refer to the acquired token from a plurality of workflows.

Meanwhile, when determining that the CPU 11 has not acquired the token (S205: No), the CPU 11 acquires error information (S207). For instance, when an error occurs during the authentication procedure, or the user fails to be authenticated to access the selected cloud server, the CPU 11 is not allowed to acquire the token. When failing to acquire the token, the CPU 11 determines that an error has occurred. Then, after S202, S206, or S207, the CPU 11 terminates the token acquiring process and returns to the workflow creating process.

Referring back to FIG. 4B, after the token acquiring process in S111, the CPU 11 determines whether the CPU 11 has acquired the token (S112). When determining that the CPU 11 has acquired the token (S112: Yes), the CPU 11 adds the acquired token to the workflow being created (S113). Specifically, the CPU 11 reads out the token from the authentication information table 82 and sets the token for the token 815 of the workflow. Meanwhile, when determining that the CPU 11 has not acquired the token (S112: No), the CPU 11 displays error information representing that an error has occurred (S114).

Further, when determining not to add the token to the workflow (S110: No), the CPU 11 determines whether to add the authentication request information to the workflow (S115). Specifically, for instance, the CPU 11 causes the touch panel 15 to display a screen for inquiring of the user whether to make a request for authentication for accessing the selected cloud server in each attempt to execute the workflow, and accepts a user operation for responding to the inquiry.

When determining to add the authentication request information to the workflow (S115: Yes), the CPU 11 adds the authentication request information to the workflow being created (S116). Specifically, the CPU 11 sets "Included" for the request 816 of the workflow. Meanwhile, when determining not to add the authentication request information to the workflow (S115: No), or after S105, S107, S113, S114, or S116, the CPU 11 determines whether the CPU 11 has accepted an instruction to store the workflow (S120).

When the settings for image scanning and data saving have been configured, for instance, the scanning application 41 becomes ready to accept a user operation to the button 415 indicated by the dashed line in FIG. 5. When determining that the CPU 11 has accepted an instruction to store the workflow (e.g., in response to accepting a user operation to the button 415) (S120: Yes), the CPU 11 stores the created workflow into the non-volatile memory 14 (S121).

In response to accepting the instruction to store the workflow (e.g., via the user operation to the button 415), the CPU 11 stores the created workflow into the non-volatile memory 14 through a procedure to determine a name and an icon of the workflow. The created workflow is added to the workflow table 81, as exemplified in FIG. 2.

When determining that the CPU 11 has not accepted an instruction to store the workflow (S120: No), the CPU 11 goes back to S102, and further accepts an instruction to configure settings for image scanning, an instruction to configure a setting for data saving, or the cancel instruction. When settings for image scanning and data saving have not been configured, the CPU 11 accepts an instruction to configure settings for image scanning or an instruction to configure a setting for data saving, without displaying the button 415. After S121, or when determining that the CPU 11 has accepted the cancel instruction (S104: Yes), the CPU 11 terminates the workflow creating process.

Figure 7A:
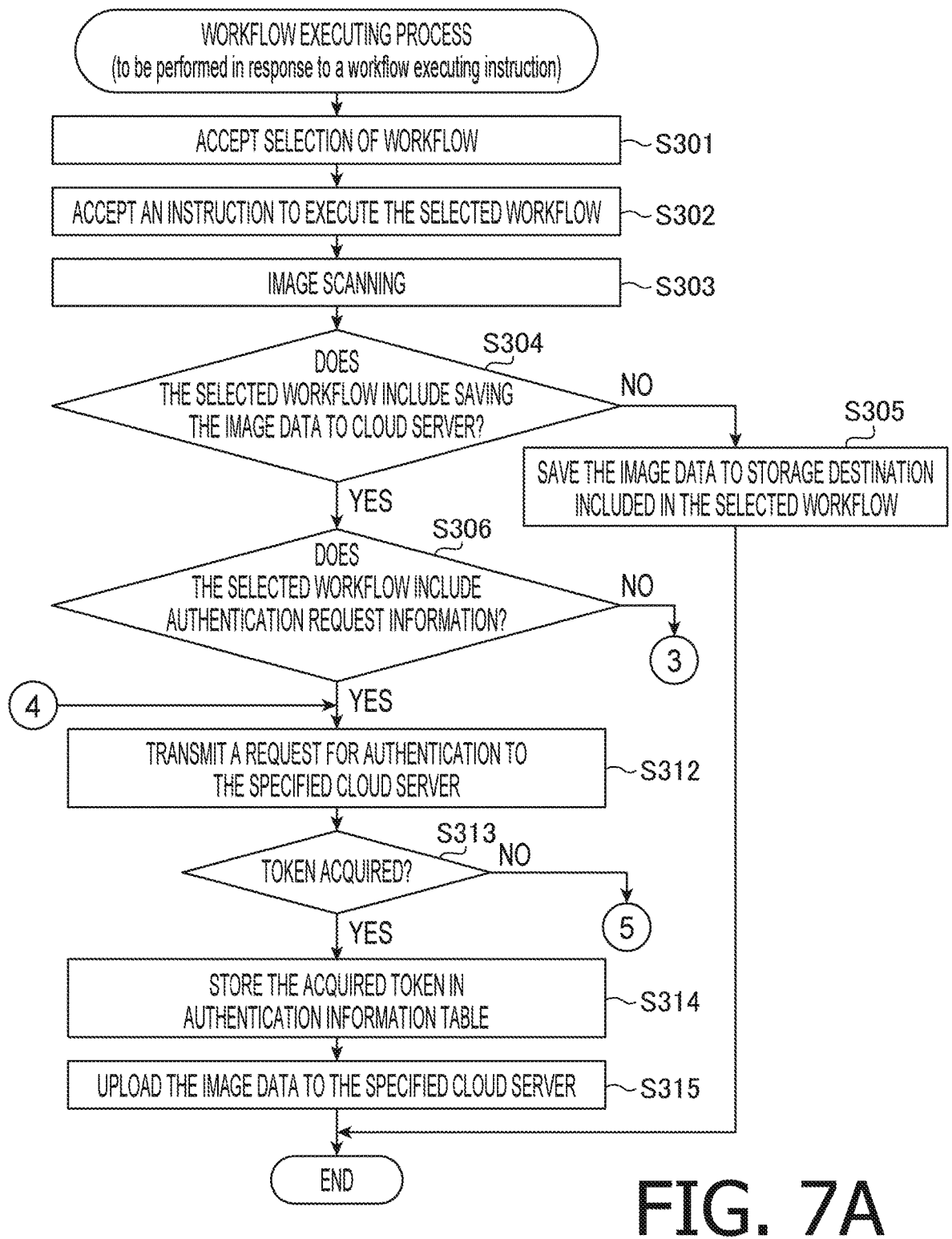
FIGS. 7A and 7B are flowcharts showing a procedure of a workflow executing process in the illustrative embodiment according to one or more aspects of the present disclosure.
Figure 7B:
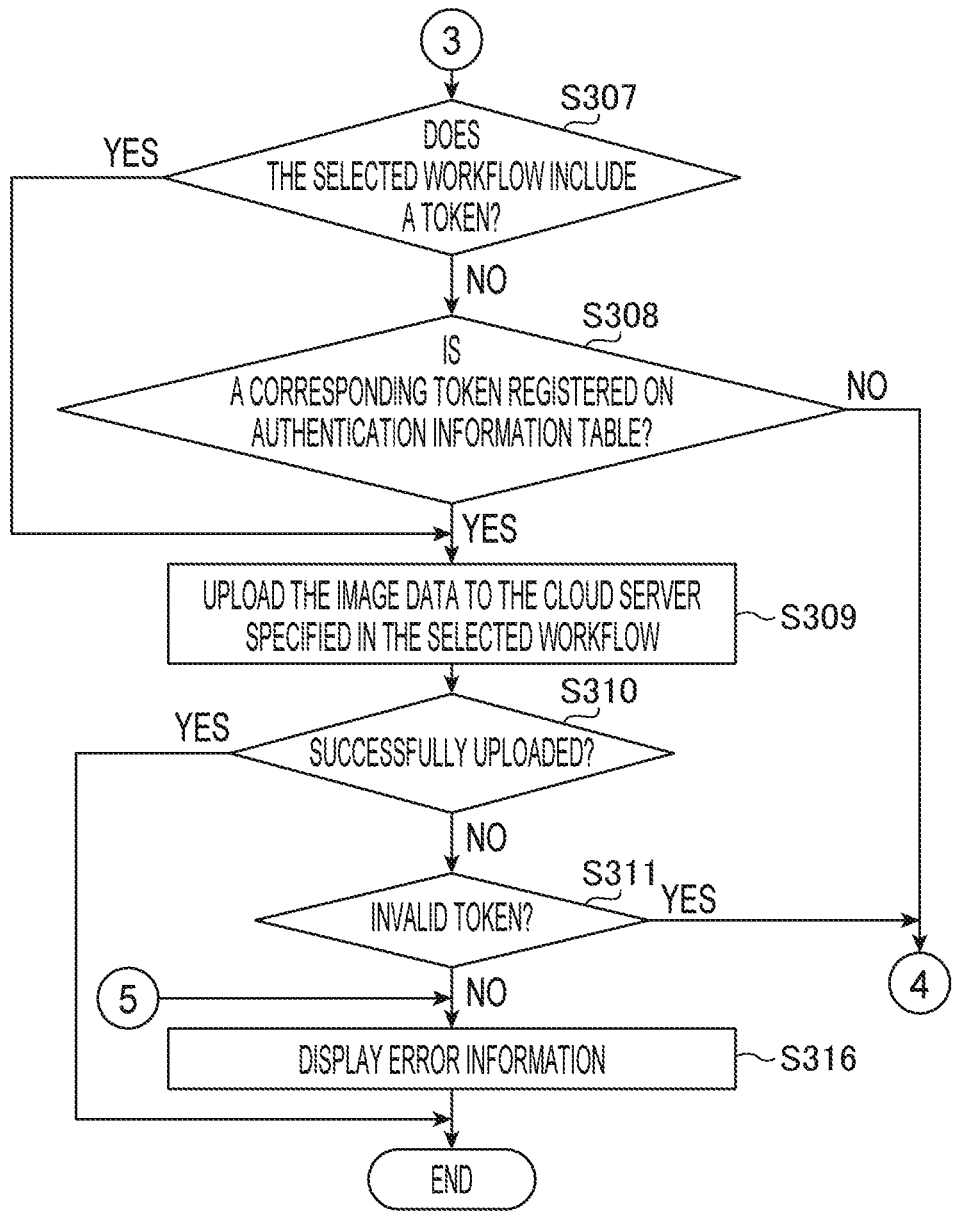

Subsequently, a procedure to execute the workflow will be described. Referring to FIGS. 7A and 7B, an explanation will be provided of a procedure of a workflow executing process by the CPU 11 to execute a workflow with the scanning application 41. The CPU 11 performs the workflow executing process in response to accepting a workflow executing instruction while executing the scanning application 41.

In the workflow executing process, initially, the CPU 11 reads out the workflow table 81 and accepts a selection of a workflow to be executed from among the workflows registered on the workflow table 81 (S301). Specifically, for instance, in response to accepting the workflow executing instruction, the scanning application 41 displays a list screen 416 for listing selectable workflows, as exemplified in FIG. 8. Then, the scanning application 41 accepts a selection of one of the selectable workflows displayed on the list screen 416. As exemplified in FIG. 8, a plurality of workflows may be shown with respective icons.

Referring back to FIG. 7A, the CPU 11 reads out the workflow selected in S301, and displays the settings for the selected workflow, as exemplified in FIG. 5. In this case, for instance, the CPU 11 may display a workflow executing button for accepting an instruction to execute the selected workflow, instead of the button 415. Then, the CPU 11 accepts a user operation to the workflow executing button (S302). Afterward, the CPU 11 causes the image scanner 2 to perform image scanning in accordance with the scanning settings 812 (see FIG. 2) included in the selected workflow, thereby acquiring image data (S303).

Then, the CPU 11 determines whether the selected workflow is a workflow including an operation of saving the image data to the cloud server (S304). When determining that the selected workflow is not a workflow (i.e., a workflow including the scan-up process) including an operation of saving the image data to a cloud server (S304: No), the CPU 11 saves the image data to the storage destination 813 included in the selected workflow (S305). Thereafter, the CPU 11 terminates the workflow executing process.

Meanwhile, when determining that the selected workflow is a workflow including an operation of saving the image data to a cloud server (S304: Yes), the CPU 11 determines whether the workflow includes the authentication request information (S306). Specifically, the CPU 11 determines whether the request 816 of the workflow is "Included." For instance, the authentication request information is the information added to the workflow in S116 of the workflow creating process (see FIGS. 4A and 4B).

When determining that the workflow does not include the authentication request information (S306: No), the CPU 11 determines whether the workflow includes a token (S307). Specifically, the CPU 11 determines whether there is information set for the token 815 of the workflow. For instance, the token is information added to the workflow in S113 of the workflow creating process (see FIGS. 4A and 4B).

When determining that the workflow does not include a token (S307: No), the CPU 11 refers to the authentication information table 82 stored in the non-volatile memory 14, and determines whether a token of a cloud server specified as the storage destination 813 in the workflow is registered on the authentication information table 82 (S308). Thus, by reference to the authentication information table 82, a same token may be used in common among a plurality of workflows using a same cloud server and not including the token.

When determining that the workflow includes a token (S307: Yes) or that the token of the cloud server specified as the storage destination 813 in the workflow is registered on the authentication information table 82 (S308: Yes), the CPU 11 uploads the image data to the cloud server by using the token (S309). Further, the CPU 11 determines whether the image data has been successfully uploaded (S310).

When determining that the image data has not been successfully uploaded (S310: No), the CPU 11 determines whether the token is invalid (S311). Specifically, the CPU 11 determines whether the CPU 11 has received error information representing that the token from the cloud server is invalid. Then, when determining that the workflow includes the authentication request information (S306: Yes), that the token of the cloud server specified as the storage destination 813 in the workflow is not registered on the authentication information table 82 (S308: No), or that the token is invalid (S311: Yes), the CPU 11 transmits a request for authentication to the cloud server (S312). It is noted that the step S312 is substantially the same operation as S204 of the token acquiring process (see FIG. 6).

When the authentication request information is added to the workflow, the CPU 11 is required to transmit a request for authentication to the cloud server even in each attempt to execute the same workflow. Thus, even when an account, which is signing in to the cloud server with the scanning application 41, is different from an account used to create the workflow (e.g., when a user, different from a user who created the workflow on the PC 1, uses the PC 1), it is possible to use the same workflow. Meanwhile, when the token is added to the workflow, the scanning application 41 only needs to read out the workflow, thereby uploading the image data to the cloud server with the token included in the workflow.

When the workflow includes the authentication request information (S306: Yes), the CPU 11 may not necessarily use the cache of the browser 42 to transmit a request for authentication to the cloud server in S312. For instance, when going to S312 after making the affirmative determination in S306 (S306: Yes), the CPU 11 may provide the browser 42 with an instruction not to use the cache. Thereby, even when the PC 1 is shared by a plurality of users, it is possible to reduce a potential risk that a user might make a request for authentication with account information of another user.

Then, the CPU 11 determines whether the CPU 11 has acquired the token (S313). When determining that the CPU 11 has acquired the token (S313: Yes), the CPU 11 stores the acquired token in the authentication information table 82 (see FIG. 3) in association with the cloud information (S314).

In the illustrative embodiment, when the workflow does not include the token or the authentication request information, the CPU 11 reads out the token from the authentication information table 82 and uses the token to execute the workflow. For instance, when the user is re-authenticated to access a cloud server in an attempt to execute a workflow, the authentication information table 82 is updated. In this case, a token acquired by the re-authentication may be used to execute another workflow using the same cloud server. Hence, there is no need to acquire a token in each attempt to execute one of workflows using the same cloud server. Thus, it is advantageous that there is no need for re-authentication to execute another workflow using the same cloud server.

After S314, the CPU 11 uploads the image data to the cloud server, using the acquired token (S315). Thereafter, the CPU 11 terminates the workflow executing process. Meanwhile, as a result of transmitting the request for authentication to the cloud server, when determining that the CPU 11 has not acquired the token (S313: No) or having failed to upload the image data due to an error, even with the valid token (S311: No), the CPU 11 displays error information representing that the image data has not been successfully uploaded to the cloud server (S316). Afterward, the CPU 11 terminates the workflow executing process.

Subsequently, export and import of a workflow will be described. In the illustrative embodiment, the scanning application 41 may generate an export file based on a created workflow and cause another PC, which is enabled to execute the scanning application 41, to import the generated export file, thereby causing the another PC to execute the same workflow. As exemplified in FIG. 8, the scanning application 41 displays an import button 417 and an export button 418 on the list screen 416. The import button 417 is configured to, when operated, accept an instruction to import a selected one of the workflows displayed on the list screen 416. The export button 418 is configured to, when operated, accept an instruction to export a selected one of the workflows displayed on the list screen 416.

Referring to FIG. 9, an explanation will be provided of a procedure of an export process by the CPU 11 to generate an export file with the scanning application 41 in the illustrative embodiment. For instance, the CPU 11 may perform the export process in response to accepting a user operation (i.e., an export instruction) to the export button 418 in a state where a workflow is selected from among the workflows displayed on the list screen 416 (see FIG. 8). In another instance, the scanning application 41 may accept a selection of one of the workflows displayed on the list screen 416 after accepting a user operation to the export button 418.

In the export process, initially, the CPU 11 reads out a workflow to be exported (S401). Then, the CPU 11 determines whether the workflow includes a token (S402).

When determining that the workflow includes a token (S402: Yes), the CPU 11 determines whether to generate an export file including the token (S403). For instance, the CPU 11 causes the touch panel 15 to display a screen for inquiring of the user whether to add the token to an export file and accepts a user operation for responding to the inquiry. When determining not to generate an export file including the token (S403: No), the CPU 11 generates an export file with the token deleted from the workflow (S404).

Meanwhile, when determining that the workflow does not include a token (S402: No) or determining to generate an export file including the token (S403: Yes), the CPU 11 generates an export file of the workflow (S405).

Further, the CPU 11 stores the generated export file into a storage location specified by the user (S406). Thereafter, the CPU 11 terminates the export process. The token is authentication information based on account information of the user who has created the workflow. Therefore, the user may add the token to the workflow to be used by the user. Nonetheless, in an attempt to export the workflow, the user may not wish to add the token to the export file. With the scanning application 41 of the illustrative embodiment, the user may select an option to generate the export file not including the token. Thus, it is possible to secure the safety of the token.

Next, referring to FIG. 10, an explanation will be provided of a procedure of an import process by the CPU 11 to import an export file generated on another PC with the scanning application 41. For instance, the CPU 11 may perform the import process in response to accepting a user operation (i.e., an import instruction) to the import button 417 on the list screen 419 (see FIG. 8).

The scanning application 41 acquires an export file from an external device. Examples of the external device may include, but are not limited to, another PC (different from the PC 1) and a server connected via a network, and storage media such as a USB memory. The scanning application 41 may once store the export file acquired from the external device into the non-volatile memory 14 and then read and import the stored export file. These operations may be construed as an example of "acquiring the export file from the external device."

In the import process, initially, the CPU 11 accepts a selection of an export file to be imported, and acquires the selected export file (S501). Then, the CPU 11 reads out a workflow from the acquired export file (S502). Further, the CPU 11 determines whether the workflow includes a token (S503).

When determining that the workflow does not include a token (S503: No), the CPU 11 determines whether to add a token to the workflow (S504). For instance, the CPU 11 causes the touch panel 15 to display information representing that the workflow does not include a token and an inquiry as to whether to add a token to the workflow, and accepts a user operation for responding to the inquiry.

When determining to add a token to the workflow (S504: Yes), the CPU 11 performs the token acquiring process shown in FIG. 6 (S505). Then, the CPU 11 determines whether the CPU 11 has acquired a token (S506). When determining that the CPU 11 has acquired a token (S506: Yes), the CPU 11 adds the acquired token to the workflow (S507). Meanwhile, when determining that the CPU 11 has not acquired a token (S506: No), the CPU 11 causes the touch panel 15 to display error information (S508).

When determining that the workflow includes a token (S503: Yes) or determining not to add a token to the workflow (S504: No), or after S507 or S508, the CPU 11 stores the workflow in the workflow table 81 (S509). Afterward, the CPU 11 terminates the import process. The scanning application 41 displays the workflow imported in the import process, for example, on the list screen 416 (see FIG. 8), and accepts a selection of the workflow via the list screen 416.

As described above, in the illustrative embodiment, the scanning application 41 stores, as a workflow, a sequence of operations to perform image scanning by the image scanner 2 and upload image data generated by the image scanner 2 to a cloud server. The scanning application 41 stores, in the authentication information table 82, cloud information and a token in association with each other. Then, the scanning application 41 may use the token read out of the authentication information table 82, in an attempt to execute the workflow. Thus, by referring to the authentication information table 82, the scanning application 41 may use a same token in a plurality of workflows using a same cloud server. The scanning application 41 updates the authentication information table 82 after the user is re-authenticated to access a cloud server with the scanning application 41. Thereby, when the user is re-authenticated to access the cloud server in an attempt to execute a workflow, the authentication information table 82 is updated. Therefore, the user may not need to be re-authenticated in each attempt to execute one of workflows using the same cloud server. Thus, it is possible to reduce troublesome operations required for authentication.

In the illustrative embodiment, the scanning application 41 may create a workflow not including a token. In an attempt to execute a workflow not including a token, the authentication information table 82 is referred to. Accordingly, a same token may be used in common among a plurality of workflows using a same cloud server and not including the token. Thus, it is possible to achieve simple operations in each of the workflows using the same cloud server.

Further, in the illustrative embodiment, the scanning application 41 accepts a selection as to whether to add the authentication request information to a workflow. In each attempt to execute a workflow including the authentication request information, each user is required to be authenticated. Therefore, for instance, even when a user is signing in to a cloud server with an account, another user is allowed to execute, with another account, a workflow including the authentication request information for accessing the cloud server. Further, when the PC 1 is shared by a plurality of users, each of the users is required to be authenticated in each attempt to execute, on the PC 1, a workflow including the authentication request information. Therefore, it is possible to reduce a potential risk that a user might execute the workflow with an account of another user. Meanwhile, in each attempt to execute a workflow not including the authentication request information, the authentication information table 82 is referred to. Hence, a same token may be used in common among the plurality of users in respective attempts to access a same cloud server.

Further, in the illustrative embodiment, the user may make a selection as to whether to add a token to each workflow. By adding a token to an individual workflow, it is possible to maintain an environment for executing the workflow with an account used when the workflow was created. For instance, even in an attempt to execute an individual workflow on the PC 1 shared by a plurality of users, each user may select an account and a token for executing the workflow.

Further, in the illustrative embodiment, the user may generate an export file not including a token. By generating the export file not including the token, it is possible to secure the safety of the token. Further, on the PC 1 that has imported an export file not including a token, in a first attempt to execute a workflow read out of the export file, the user may acquire the token, for instance, using the cache of the browser 42. Namely, using account information used on the PC 1, it is possible to easily execute the workflow. It is noted that even when an export file including the authentication request information is generated, it is possible to easily execute a workflow read out of the export file, on the PC 1 that has imported the export file, in substantially the same manner as the above case where an export file not including a token is generated.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and is capable of changes or modifications within the scope of the inventive concept as expressed herein. For instance, the following modifications according to aspects of the present disclosure are feasible.

An image processing apparatus connected with the PC 1 is not limited to an apparatus (e.g., the image scanner 2) to acquire image data, but may be an apparatus (e.g., a printer) to perform printing based on image data. Namely, aspects of the present disclosure may be applied to not only a workflow that stores a sequence of operations including performing image scanning and saving image data acquired via the image scanning but also a workflow that stores a sequence of operations including downloading image data from a cloud server and performing printing based on the image data.

Further, for instance, when a token registered on the authentication information table 82 (see FIG. 3) is updated, corresponding information registered as the token 815 on the workflow table 81 (see FIG. 2) may be updated as well. For instance, when the CPU 11 acquires a new token, different from an old token, in response to transmitting a further request for authentication to a specific cloud server in the token acquiring process (see FIG. 6), if the workflow table 81 stores one or more workflows each including the specific cloud server as the cloud information 814 and the old token as the token 815, the corresponding information registered as the token 815 may be updated. Thus, as the same token is used to access the same cloud server in a plurality of workflows, it is possible to reduce troublesome operations when the user is re-authenticated to access the cloud server.

Further, for instance, the scanning application 41 (more specifically, the CPU 11 executing the scanning application 41) may not accept a selection as to whether to add a token to the workflow being created. For instance, in every attempt to create a workflow, the scanning application 41 may not add a token to the workflow. In this case, the token 815 of the workflow table 81 may be unnecessary. Then, for instance, the steps S110 to S114 may be deleted from the workflow creating process shown in FIGS. 4A and 4B. In this case, when determining that a cloud server has been selected (S109: Yes), the CPU 11 may go directly to S115.

In another instance, in every attempt to create a workflow, the scanning application 41 may add a token to the workflow. In this case, S110 may be deleted from the workflow creating process shown in FIGS. 4A and 4B. Further, in this case, when determining that a cloud server has been selected (S109: Yes), the CPU 11 may go directly to S115. Further, in this case, when determining not to add the authentication request information to the workflow (S115: No), the CPU 11 may go to S111.

Further, for instance, in an attempt to export or import a workflow as well, the scanning application 41 may not accept a selection as to whether to add a token to the workflow. For instance, in every attempt to generate an export file, the scanning application 41 may not add a token to the export file. In this case, S403 may be deleted from the export process shown in FIG. 9. Further, in this case, when determining that the workflow includes a token (S402: Yes), the CPU 11 may go directly to S404. Further, in an attempt to import an export file of a workflow including a token, the scanning application 41 may deletes the token from the workflow read out of the export file and store the workflow. In this case, the steps S504 to S508 may be deleted from the import process shown in FIG. 10. Further, in this case, when determining that the workflow includes a token (S503: Yes), the CPU 11 may delete the token and store the workflow. In another instance, the steps S503 to S508 may be deleted from the import process shown in FIG. 10. In this case, the CPU 11 may store the workflow read out of the export file, as is, regardless of whether the workflow includes a token.

Further, for instance, the scanning application 41 may not accept a selection as to whether to add the authentication request information to the workflow being created. For instance, in every attempt to create a workflow, the scanning application 41 may not add the authentication request information to the workflow. In this case, the request 816 of the workflow table 81 may be unnecessary. Further, for instance, the steps S115 and S116 may be deleted from the workflow creating process shown in FIGS. 4A and 4B.

Further, for instance, the order of the determination as to whether to add a token to the workflow being created and the determination as to whether to add the authentication request information to the workflow being created may be reversed. For instance, in the workflow creating process shown in FIGS. 4A and 4B, when determining that a cloud server has been selected (S109: Yes), the CPU 11 may go to S115. In this case, when determining not to add the authentication request information to the workflow (S115: No), the CPU 11 may go to S110. Further, in the workflow executing process, when determining that the selected workflow is a workflow including an operation of saving the image data to the cloud server (S304: Yes), the CPU 11 may go to S307. In this case, when determining that the workflow includes a token (S307: Yes), the CPU 11 may go to S306. Further, in this case, when determining that the workflow does not include the authentication request information (S306: No), the CPU 11 may go to S308.

In the aforementioned illustrative embodiment, in the export process, the scanning application 41 accepts a selection of a workflow to be exported and generates an export file of the selected workflow. Nonetheless, a plurality of workflows may be exported in the export process. For instance, all the workflows stored in the workflow table 81 may be collectively exported.

Further, for instance, the scanning application 41 may not accept a selection of a cloud server. For instance, a cloud server to which image data is uploaded with the scanning application 41 may be a fixed cloud server. Further, for instance, on the authentication information table 82, an individual token may be stored in association with not only the cloud information but also user information. Further, for instance, the export process may not necessarily be performed with the scanning application 41. Moreover, the import process may not necessarily be performed with the scanning application 41.

Further, for instance, after reading out a token stored in the workflow table 81 or the authentication information table 82, the scanning application 41 may check whether the token is valid. For instance, the CPU 11 may inquire of a corresponding cloud server whether the token is valid. In another instance, when storing a token in the workflow table 81 or the authentication information table 82, the CPU 11 may store validity information for the token such as an expiration date and a maximum number of valid uses of the token as well. In this case, the CPU 11 may read out the token from the workflow table 81 or the authentication information table 82 and determine whether the token is valid based on the validity information.

Further, each process as exemplified in the aforementioned illustrative embodiment may be performed by one or more CPUs, one or more hardware elements such as ASICs, or a combination including at least two of one or more CPUs and one or more hardware elements such as ASICs. Further, aspects of the present disclosure may be practiced as a non-transitory computer-readable medium storing computer-executable instructions that, when executed, cause a processor to perform processes as exemplified in the aforementioned illustrative embodiment. Moreover, aspects of the present disclosure may be practiced as a method implementable on a processor to perform processes as exemplified in the aforementioned illustrative embodiment.

Associations between elements exemplified in the aforementioned illustrative embodiments and elements according to aspects of the present disclosure will be exemplified below. The PC 1 may be an example of an "information processing device" according to aspects of the present disclosure. The CPU 11 of the PC 1 may be an example of a "processor" of the "information processing device" according to aspects of the present disclosure. The non-volatile memory 14 of the PC 1 may be an example of a "non-transitory computer-readable medium" according to aspects of the present disclosure. The non-volatile memory 14 may be an example of a "memory" of the "information processing device" according to aspects of the present disclosure. The touch panel 15 of the PC 1 may be an example of a "user interface" of the "information processing device" according to aspects of the present disclosure. The scanning application 41 may be an example of "computer-executable instructions" according to aspects of the present disclosure. The control board 10 of the PC 1 may be an example of a "controller" of the "information processing device" according to aspects of the present disclosure.

What is claimed is:

1. A non-transitory computer-readable medium storing computer-executable instructions configured to, when executed by a processor of an information processing device, cause the processor to:

in response to accepting a sequence creating instruction, perform a sequence creating process comprising:
accepting settings for a sequence of operations via a user interface of the information processing device, the sequence of operations being executable via authenticated access to a cloud server;
accepting, via the user interface, a selection of the cloud server from among a plurality of cloud servers;
acquiring, from the selected cloud server, authentication information required to access the selected cloud server;
storing the acquired authentication information in association with cloud information specifying the selected cloud server;
creating a first sequence record including setting information and the cloud information associated with each other, the setting information representing the settings for the sequence of operations; and
storing the created first sequence record into a memory of the information processing device; and in response to accepting a sequence executing instruction, perform a sequence executing process comprising:
in response to accepting, via the user interface, a selection of the first sequence record from among a plurality of sequence records stored in the memory, reading out the selected first sequence record from the memory;
executing the sequence of operations in accordance with the setting information included in the read first sequence record;
during the sequence of operations, accessing the cloud server specified by the cloud information included in the first sequence record, with the authentication information corresponding to the specified cloud server;
in response to accepting, via the user interface, a selection of a second sequence record from among the plurality of sequence records stored in the memory, reading out the selected second sequence record from the memory, the second sequence record including the same cloud information as included in the first sequence record;
executing another sequence of operations in accordance with setting information included in the read second sequence record; and
during the another sequence of operations, accessing the cloud server specified by the same cloud information as included in the first sequence record, with the authentication information stored in association with the same cloud information as included in the first sequence record.

2. A non-transitory computer-readable medium storing computer-executable instructions configured to, when executed by a processor of an information processing device, cause the processor to:

accept settings for a sequence of operations via a user interface of the information processing device, the sequence of operations being executable via authenticated access to a cloud server;
accept, via the user interface, a selection of the cloud server from among a plurality of cloud servers;
acquire, from the selected cloud server, authentication information required to access the selected cloud server;
store the acquired authentication information in association with cloud information specifying the selected cloud server into a memory of the information processing device; and
store a first sequence record into the memory, the first sequence record including setting information and the cloud information associated with each other, the setting information representing the settings for the sequence of operations, the first sequence record not including the authentication information, and in response to accepting a sequence executing instruction, perform a sequence executing process comprising:

in response to accepting, via the user interface, a selection of the first sequence record from among a plurality of sequence records stored in the memory, reading out the selected first sequence record from the memory;

executing the sequence of operations in accordance with the setting information included in the read first sequence record;

during the sequence of operations, accessing the cloud server specified by the cloud information included in the first sequence record, with the authentication information corresponding to the specified cloud server;

in response to accepting, via the user interface, a selection of a second sequence record from among the plurality of sequence records stored in the memory, reading out the selected second sequence record from the memory, the second sequence record including the same cloud information as included in the first sequence record;

executing another sequence of operations in accordance with setting information included in the read second sequence record; and during the another sequence of operations, accessing the cloud server specified by the same cloud information as included in the first sequence record, with the authentication information stored in association with the same cloud information as included in the first sequence record, wherein the sequence executing process further comprises:

during the sequence of operations, reading out the authentication information associated with the cloud information specifying the selected cloud server, from the memory, and accessing the specified cloud server with the read authentication information.

3. The non-transitory computer-readable medium according to claim 2, wherein the instructions are further configured to, when executed by the processor, cause the processor to:

accept, via the user interface, a selection as to whether to add authentication request information to the first sequence record, the authentication request information causing the processor to transmit a request for the authentication information to the selected cloud server;

when accepting a selection to add the authentication request information to the first sequence record, store the first sequence record including the authentication request information; and when accepting a selection not to add the authentication request information to the first sequence record, store the first sequence record not including the authentication request information, and wherein the sequence executing process further comprises:

during the sequence of operations, performing:

determining whether the first sequence record includes the authentication request information;

when determining that the first sequence record includes the authentication request information, transmitting the request for the authentication information to the specified cloud server;

receiving the authentication information transmitted by the specified cloud server in response to the request for the authentication information; and accessing the specified cloud server with the received authentication information.

4. A non-transitory computer-readable medium storing computer-executable instructions configured to, when executed by a processor of an information processing device, cause the processor to:

accept settings for a sequence of operations via a user interface of the information processing device, the sequence of operations being executable via authenticated access to a cloud server;

accept, via the user interface, a selection of the cloud server from among a plurality of cloud servers;

acquire, from the selected cloud server, authentication information required to access the selected cloud server;

store the acquired authentication information in association with cloud information specifying the selected cloud server into a memory of the information processing device; and store a first sequence record into the memory, the first sequence record including setting information and the cloud information associated with each other, the setting information representing the settings for the sequence of operations accept, via the user interface, a selection as to whether to add authentication information to the first sequence record;

when accepting a selection to add the authentication information to the first sequence record, store the first sequence record including the authentication information; and when accepting a selection not to add the authentication information to the first sequence record, store the first sequence record not including the authentication information, and in response to accepting a sequence executing instruction, perform a sequence executing process comprising:

in response to accepting, via the user interface, a selection of the first sequence record from among a plurality of sequence records stored in the memory, reading out the selected first sequence record from the memory;

executing the sequence of operations in accordance with the setting information included in the read first sequence record;

during the sequence of operations, accessing the cloud server specified by the cloud information included in the first sequence record, with the authentication information corresponding to the specified cloud server;

in response to accepting, via the user interface, a selection of a second sequence record from among the plurality of sequence records stored in the memory, reading out the selected second sequence record from the memory, the second sequence record including the same cloud information as included in the first sequence record;

executing another sequence of operations in accordance with setting information included in the read second sequence record; and during the another sequence of operations, accessing the cloud server specified by the same cloud information as included in the first sequence record, with the authentication information stored in association with the same cloud information as included in the first sequence record, wherein the sequence executing process further comprises:
during the sequence of operations, performing:
determining whether the read first sequence record includes the authentication information;
when determining that the read first sequence record includes the authentication information, accessing the specified cloud server with the authentication information included in the first sequence record; and
when determining that the read first sequence record does not include the authentication information, accessing the specified cloud server with the authentication information stored in the memory.

5. A non-transitory computer-readable medium storing computer-executable instructions configured to, when executed by a processor of an information processing device, cause the processor to:
accept settings for a sequence of operations via a user interface of the information processing device, the sequence of operations being executable via authenticated access to a cloud server;
accept, via the user interface, a selection of the cloud server from among a plurality of cloud servers;
acquire, from the selected cloud server, authentication information required to access the selected cloud server;
store the acquired authentication information in association with cloud information specifying the selected cloud server;
store a first sequence record into a memory of the information processing device, the first sequence record including setting information and the cloud information associated with each other, the setting information representing the settings for the sequence of operations; and
in response to accepting a sequence executing instruction, perform a sequence executing process comprising:
in response to accepting, via the user interface, a selection of the first sequence record from among a plurality of sequence records stored in the memory, reading out the selected first sequence record from the memory;
executing the sequence of operations in accordance with the setting information included in the read first sequence record;
during the sequence of operations, accessing the cloud server specified by the cloud information included in the first sequence record, with the authentication information corresponding to the specified cloud server;
in response to accepting, via the user interface, a selection of a second sequence record from among the plurality of sequence records stored in the memory, reading out the selected second sequence record from the memory, the second sequence record including the same cloud information as included in the first sequence record;
executing another sequence of operations in accordance with setting information included in the read second sequence record; and
during the another sequence of operations, accessing the cloud server specified by the same cloud information as included in the first sequence record, with the authentication information stored in association with the same cloud information as included in the first sequence record, wherein the instructions are further configured to, when executed by the processor, cause the processor to perform:
an export process comprising:
reading out at least one of the plurality of sequence records stored in the memory, each of the plurality of sequence records including the same cloud information as included in the first sequence record;
generating an export file including the at least one sequence record read out from the memory and not including the authentication information; and
exporting the export file; and
an import process comprising:
acquiring another export file from an external device;
reading out one or more sequence records included in the acquired another export file; and
storing, into the memory, the one or more sequence records read out from the another export file.

6. A non-transitory computer-readable medium storing computer-executable instructions configured to, when executed by a processor of an information processing device, cause the processor to:
in response to accepting a sequence creating instruction, perform a sequence creating process comprising:
accepting settings for a sequence of operations via a user interface of the information processing device, the sequence of operations being executable via authenticated access to a cloud server;
accepting, via the user interface, a selection of the cloud server from among a plurality of cloud servers;
acquiring, from the selected cloud server, authentication information required to access the selected cloud server;
storing the acquired authentication information in association with cloud information specifying the selected cloud server;
creating a sequence record including setting information and the cloud information associated with each other, the setting information representing the settings for the sequence of operations; and
storing the created sequence record into a memory of the information processing device; and
in response to accepting a sequence executing instruction, perform a sequence executing process comprising:
in response to accepting, via the user interface, a selection of the sequence record from among a plurality of sequence records stored in the memory, reading out the selected sequence record from the memory;
executing the sequence of operations in accordance with the setting information included in the selected sequence record; and
during the sequence of operations, performing:
when the selected sequence record does not include the authentication information, reading out the authentication information stored in association with the same cloud information as included in the selected sequence record; and
accessing the cloud server specified by the cloud information included in the selected sequence record, with the read authentication information.

7. A non-transitory computer-readable medium storing computer-executable instructions configured to, when executed by a processor of an information processing device, cause the processor to:
- accept settings for a sequence of operations via a user interface of the information processing device, the sequence of operations being executable via authenticated access to a cloud server;
- accept, via the user interface, a selection of the cloud server from among a plurality of cloud servers;
- acquire, from the selected cloud server, authentication information required to access the selected cloud server;
- store the acquired authentication information in association with cloud information specifying the selected cloud server into a memory of the information processing device;
- store a sequence record into the memory, the sequence record including setting information and the cloud information associated with each other, the setting information representing the settings for the sequence of operations, the sequence record not including the authentication information, and
- in response to accepting a sequence executing instruction, perform a sequence executing process comprising:
  - in response to accepting, via the user interface, a selection of the sequence record from among a plurality of sequence records stored in the memory, reading out the selected sequence record from the memory;
  - executing the sequence of operations in accordance with the setting information included in the selected sequence record; and
  - during the sequence of operations, performing:
    - when the selected sequence record does not include the authentication information, reading out the authentication information stored in association with the same cloud information as included in the selected sequence record; and
    - accessing the cloud server specified by the cloud information included in the selected sequence record, with the read authentication information.

8. A non-transitory computer-readable medium storing computer-executable instructions configured to, when executed by a processor of an information processing device, cause the processor to:
- accept settings for a sequence of operations via a user interface of the information processing device, the sequence of operations being executable via authenticated access to a cloud server;
- accept, via the user interface, a selection of the cloud server from among a plurality of cloud servers;
- acquire, from the selected cloud server, authentication information required to access the selected cloud server;
- store the acquired authentication information in association with cloud information specifying the selected cloud server into a memory of the information processing device;
- store a sequence record into the memory, the sequence record including setting information and the cloud information associated with each other, the setting information representing the settings for the sequence of operations;
- accept, via the user interface, a selection as to whether to add authentication information to the sequence record;
  - when accepting a selection to add the authentication information to the sequence record, store the sequence record including the authentication information; and
  - when accepting a selection not to add the authentication information to the sequence record, store the sequence record not including the authentication information, and
- in response to accepting a sequence executing instruction, perform a sequence executing process comprising:
  - in response to accepting, via the user interface, a selection of the sequence record from among a plurality of sequence records stored in the memory, reading out the selected sequence record from the memory;
  - executing the sequence of operations in accordance with the setting information included in the selected sequence record; and
  - during the sequence of operations, performing:
    - when the selected sequence record does not include the authentication information, reading out the authentication information stored in association with the same cloud information as included in the selected sequence record; and
    - accessing the cloud server specified by the cloud information included in the selected sequence record, with the read authentication information.

9. A non-transitory computer-readable medium storing computer-executable instructions configured to, when executed by a processor of an information processing device, cause the processor to:
- accept settings for a sequence of operations via a user interface of the information processing device, the sequence of operations being executable via authenticated access to a cloud server;
- accept, via the user interface, a selection of the cloud server from among a plurality of cloud servers;
- acquire, from the selected cloud server, authentication information required to access the selected cloud server;
- store the acquired authentication information in association with cloud information specifying the selected cloud server;
- store a sequence record into a memory of the information processing device, the sequence record including setting information and the cloud information associated with each other, the setting information representing the settings for the sequence of operations; and
- in response to accepting a sequence executing instruction, perform a sequence executing process comprising:
  - in response to accepting, via the user interface, a selection of the sequence record from among a plurality of sequence records stored in the memory, reading out the selected sequence record from the memory;
  - executing the sequence of operations in accordance with the setting information included in the selected sequence record; and
  - during the sequence of operations, performing:
    - when the selected sequence record does not include the authentication information, reading out the authentication information stored in association with the same cloud information as included in the selected sequence record; and
    - accessing the cloud server specified by the cloud information included in the selected sequence record, with the read authentication information, wherein the instructions are further configured to, when executed by the processor, cause the processor to perform:
an export process comprising:
  reading out at least one of the plurality of sequence records stored in the memory, each of the plurality of sequence records including the same cloud information as included in the sequence record;
  generating an export file including the at least one sequence record read out from the memory and not including the authentication information; and
  exporting the export file; and
an import process comprising:
  acquiring another export file from an external device;
  reading out one or more sequence records included in the acquired another export file; and
  storing, into the memory, the one or more sequence records read out from the another export file.

* * * * *